United States Patent
Rodrigo

(10) Patent No.: US 11,979,824 B2
(45) Date of Patent: May 7, 2024

(54) SERVICE REQUEST HANDLING

(71) Applicant: Telefonaktiebolaget LM Ericsson (publ), Stockholm (SE)

(72) Inventor: Maria Cruz Bartolome Rodrigo, Torremocha de Jarama (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/018,896

(22) PCT Filed: Jun. 25, 2021

(86) PCT No.: PCT/EP2021/067510
§ 371 (c)(1),
(2) Date: Jan. 31, 2023

(87) PCT Pub. No.: WO2022/022909
PCT Pub. Date: Feb. 3, 2022

(65) Prior Publication Data
US 2023/0309005 A1 Sep. 28, 2023

(30) Foreign Application Priority Data
Jul. 31, 2020 (EP) .................................... 20382706

(51) Int. Cl.
*H04W 48/18* (2009.01)
*H04L 67/56* (2022.01)
*H04L 67/60* (2022.01)

(52) U.S. Cl.
CPC ............. *H04W 48/18* (2013.01); *H04L 67/56* (2022.05); *H04L 67/60* (2022.05)

(58) Field of Classification Search
CPC ......... H04W 48/18; H04L 67/56; H04L 67/60
See application file for complete search history.

(56) References Cited

U.S. PATENT DOCUMENTS 10,772,062 B1* 9/2020 Albasheir ........... H04L 67/1034
2017/0187572 A1* 6/2017 Wu ....................... H04L 41/082
2020/0314672 A1* 10/2020 Farooq ................ H04L 43/0817

FOREIGN PATENT DOCUMENTS

WO 2019162862 A1 8/2019

OTHER PUBLICATIONS

Author Unknown, "Technical Specification Group Services and System Aspects; System architecture for the 5G System (5GS); Stage 2 (Release 16)," Technical Specification 23.501, Version 16.4.0, Mar. 2020, 3GPP Organizational Partners, 430 pages.

(Continued)

*Primary Examiner* — Cheikh T Ndiaye
(74) *Attorney, Agent, or Firm* — Withrow & Terranova, PLLC

(57) ABSTRACT

There is provided a method for handling a service request. The method is performed by a selection node. The method comprises initiating transmission of a first message towards at least a first Network Function (NF) node via a first Service Communication Proxy (SCP) node, wherein the first message is a status request. The method further comprises receiving, from the first SCP node, a second message indicating the status of the first NF node. The method also comprises determining whether or not to initiate transmission of a first request, for the provision of a first service, via the first SCP node to the first NF node, the determination of whether or not to initiate transmission of the first request to the first NF node being made based on the status of the first NF node indicated by the second message.

11 Claims, 10 Drawing Sheets

(56) References Cited

OTHER PUBLICATIONS

Author Unknown, "Technical Specification Group Services and System Aspects; System architecture for the 5G System (5GS); Stage 2 (Release 16)," Technical Specification 23.501, Version 16.5.0, Jul. 2020, 3GPP Organizational Partners, 441 pages.
Author Unknown, "Technical Specification Group Core Network and Terminals; 5G System; Technical Realization of Service Based Architecture; Stage 3 (Release 16)," Technical Specification 29.500, Version 16.2.1, Jan. 2020, 3GPP Organizational Partners, 50 pages.
Author Unknown, "Technical Specification Group Core Network and Terminals; 5G System; Technical Realization of Service Based Architecture; Stage 3 (Release 16)," Technical Specification 29.500, Version 16.3.0, Mar. 2020, 3GPP Organizational Partners, 65 pages.
Ericsson, "C4-201095: Failover cause," 3GPP TSG-CT WG4 Meeting #96e, Feb. 17-28, 2020, Electronic Meeting, 7 pages.
International Search Report and Written Opinion for International Patent Application No. PCT/EP2021/067510, dated Sep. 10, 2021, 11 pages.
International Preliminary Report on Patentability for International Patent Application No. PCT/EP2021/067510, dated Oct. 28, 2022, 15 pages.

* cited by examiner

SERVICE REQUEST HANDLING

This application is a 35 U.S.C. § 371 national phase filing of International Application No. PCT/EP2021/067510, filed Jun. 25, 2021, which claims the benefit of European Patent Application No. 20382706.8, filed Jul. 31, 2020, the disclosures of which are incorporated herein by reference in their entireties.

TECHNICAL FIELD

The disclosure relates to methods for handling a service request in a network and nodes configured to operate in accordance with those methods.

BACKGROUND

There exist various techniques for handling a request for a service in a network. A service request is generally from a consumer of the service ("service consumer") to a producer of the service ("service producer"). For example, a service request may be from a network function (NF) node of a service consumer to an NF node of a service producer. The NF node of the service consumer and the NF node of the service producer can communicate directly or indirectly. This is referred to as direct communication and indirect communication respectively. In the case of indirect communication, the NF node of the service consumer and the NF node of the service producer may communicate via a service communication proxy (SCP) node.

FIG. 1A-D illustrates different existing systems for handling service requests, as set out in 3GPP TS 23.501 v16.5.0 (available at https://portal.3gpp.org/desktopmodules/Specifications/SpecificationDetails.aspx?specificationId=3144 as of 25 Jul. 2020). In more detail, FIGS. 1A and 1B illustrates a system that uses direct communication, while FIGS. 1C and 1D illustrates a system that uses indirect communication.

In the systems illustrated in FIGS. 1A and 1B, a service request is sent directly from the NF node of the service consumer to the NF node of the service producer. A response to the service request is sent directly from the NF node of the service producer to the NF node of the service consumer. Similarly, any subsequent service requests are sent directly from the NF node of the service consumer to the NF node of the service producer. The system illustrated in FIG. 1B also comprises a network repository function (NRF). Thus, in the system illustrated in FIG. 1B, the NF node of the consumer can query the NRF to discover suitable NF nodes of the service producer to which to send the service request. In response to such a query, the NF node of the consumer can receive an NF profile for one or more NF nodes of the service producer and, based on the received NF profile(s) can select an NF node of the service producer to which to send the service request. In the system illustrated in FIG. 1A, the NRF is not used and instead the NF node of the consumer may be configured with the NF profile(s) of the NF node(s) of the service producer.

In the systems illustrated in FIGS. 1C and 1D, a service request is sent indirectly from the NF node of the service consumer to the NF node of the service producer via a service communication proxy (SCP) node. A response to the service request is sent indirectly from the NF node of the service producer to the NF node of the service consumer via the SCP. Similarly, any subsequent service requests are sent indirectly from the NF node of the service consumer to the NF node of the service producer via the SCP. The systems illustrated in FIGS. 1C and D also comprise an NRF.

In the system illustrated in FIG. 1C, the NF node of the consumer can query the NRF to discover suitable NF nodes of the service producer to which to send the service request. In response to such a query, the NF node of the consumer can receive an NF profile for one or more NF nodes of the service producer and, based on the received NF profile(s) can select an NF node of the service producer to which to send the service request. In this case, the service request sent from the NF node of the service consumer to the SCP comprises the address of the selected NF node of the service producer. The NF node of the service consumer can forward the service request without performing any further discovery or selection. In case the selected NF node of the service producer is not accessible for any reason, it may be up to the NF node of the service consumer to find an alternative. In other cases, the SCP may communicate with the NRF to acquire selection parameters (e.g. location, capacity, etc.) and the SCP may select an NF node of the service producer to which to send the service request.

In the system illustrated in FIG. 1D, the NF node of the consumer does not carry out the discovery or selection process. Instead, the NF node of the consumer adds any necessary discovery and selection parameters (required to find a suitable NF node of the service producer) to the service request that it sends via the SCP. The SCP uses the request address and the discovery and selection parameters in the service request to route the service request to a suitable NF node of the service producer. The SCP can perform discovery with the NRF.

Typically, an NF consumer node (NFc) should supervise the NF producer node (NFp) health status by sending a Hypertext Transfer Protocol Version 2 PING (HTTP/2 PING), as discussed in the 3GPP TS documents cited herein. An NF acting as an HTTP/2 client may support testing whether a connection is still active by sending a PING frame. When and how often a PING frame may be sent can be implementation specific but may be configurable by operator policy. In case of indirect communication, that is, when an SCP node is an intermediary element between the NFc node and the NFp node, then the SCP node may supervise NFp node health by making use of the PING.

For the fifth generation core (5GC), from Release 16, the SCP is included as a network element to allow indirect communication between an NF node of a service consumer and an NF node of a service producer. The indirect communication that is used can be either of the two indirect communications options described earlier with reference to FIGS. 1C and 1D.

3GPP TS 29.500 V 16.3.0, available at https://portal.3gpp.org/desktopmodules/Specifications/SpecificationDetails.aspx?specificationId=3338 as of 25 Jul. 2020, provides a discussion of technical realization of the 5GC Service Based Architecture, protocols supported over the Service Based Interfaces, and the functionalities supported in the Service Based Architecture.

FIG. 2A-B is a signalling diagram illustrating an exchange of signals in an existing system, such as the system illustrated in FIG. 1C but it will be understood the issue described can also apply to the system illustrated in FIG. 1D. The system illustrated in FIG. 2A-B comprises a first SCP node 10, an NF node 20 of a service consumer ("NFc"), a first NF node 30 of a service producer ("NFp1"), a second NF node 70 of a service producer ("NFp2") and a third NF node 90 of a service producer ("NFp3"). The first SCP node 10 is configured to operate as an SCP between the NFc node 20 and the first NF node 30. The first NF node 30 can be configured to run a service 40, the second NF node 70 can be configured to run a service 80 and the third NF node 90 can be configured to run a service 100. The first NF node 30, second NF node 70 and third NF node 90 can be configured to run the same service or a different service. The first NF node 30, second NF node 70 and third NF node 90 can be part of a set 402 of NF nodes of a service producer. The system illustrated in FIG. 2A-B also comprises a network repository function 60.

In FIG. 2A-B, steps 600-622 relate to a first request for a user equipment (UE)/session context. As illustrated by block 500 of FIG. 2A-B, the UE/session context may be stored. In more detail, as illustrated by block 600 of FIG. 2A-B, the NFc node 20 determines what discovery and selection parameters to use. The parameters can be associated with a certain service in a received request, which is not illustrated in FIG. 2A-B. As illustrated by blocks 502 and 602 of FIG. 2A-B, the NFc node 20 stores the UE/session context for the request received. This storage may be cached or externally stored.

As illustrated by arrow 604 of FIG. 2A-B, the NFc node 20 initiates transmission of a discovery request to the NRF 60 to obtain NF profile(s) of one or more NF nodes of the service producer for the service that needs to be executed. As illustrated by arrow 606 of FIG. 2A-B, the NFc node 20 receives a response from the NRF 60 comprising the NF profile(s) of one or more NF nodes of the service producer. As illustrated by blocks 504 and 608 of FIG. 2A-B, the NFc node 20 can store the discovered NF profile(s) in the corresponding UE/session context. As illustrated by block 610 of FIG. 2A-B, the NFc node 20 selects one NF node of the service producer from the one(s) discovered using, for example, functional criteria (e.g. subscription permanent identifier (SUPI), network slice selection assistance information (NSSAI), data network name (DNN), etc.) or non-functional criteria (e.g. load, capacity, etc.). For the purpose of the illustration, it is assumed that the NFc node 20 selects the first NF node 30.

One of the selection criteria may be the NFp status that is updated in the NFp profile in the NRF 60. This NFp status is mostly operative, and only three statuses are defined: REGISTERED, UNDISCOVERABLE, SUSPENDED. A SUSPENDED status may indicate that the respective NFp node is not operative, or that the connectivity from the NRF 60 to the respective NFp node has failed (the status can be based on heartbeat messages sent from the NRF node 60 to the respective NFp node). The supervision performed by the NRF 60 is not fully conclusive and also is performed with long time periods, in the order of minutes. Accordingly, a PING message may be used to check the status of the NFp nodes.

As illustrated by arrow 612 of FIG. 2A-B, the NFc node 20 initiates transmission of a service request towards the first SCP node 10. The NFc node 20 may know via which SCP to route the service request by configuration or other means. The service request can comprise information identifying the selected first NF node 30, such as a hypertext transfer protocol (HTTP) header that identifies the selected first NF node 30 (the target application programming interface (API) root). As illustrated by block 614 of FIG. 2A-B, the first SCP node 10 replaces its own address in the host part of the uniform resource identifier (URI) by the one included in service request (the target API root). As illustrated by block 616 of FIG. 2A-B, the first SCP node 10 may optionally perform any extra functionality, such as monitoring/tracing.

As illustrated by arrow 618 of FIG. 2A-B, the first SCP node 10 initiates transmission of the service request towards the selected first NF node 30. As illustrated by arrow 620 of FIG. 2A-B, the first SCP node 10 receives a response comprising the result. The result may comprise some business logic (BL) information, e.g. as a result of the service execution. In the illustrated example, the result is a failure result (for example, the result is a 5xx error or a lack of a response to the service request from the selected first NF node 30, as opposed to a success result). As the NFc node 20 does not have information on the actual status of the NFp nodes (it is unable to supervise the NFp nodes), the NFc node 20 is required to select an NFp node without this status information. In this example, the NFc node 20 has selected an instance (NFp1, the first NF node 30) that is not currently working (indicated by a flash symbol in FIG. 2A-B). The request therefore fails.

As illustrated by arrow 622 of FIG. 2A-B, the first SCP node 10 initiates transmission of the response comprising the result (in this example a 5xx error) towards the NFc node 20. In cases where there is a lack of response to the service request from the selected NFp node, the first SCP node 10 may convert this into an appropriate error to transmit to the NFc node 20.

The NFc node 20 receives the result from the first SCP node 10. As the result is a failure result, as illustrated by block 624 of FIG. 2A-B, the NFc node 20 determines that the selected NFp (the first NF node 30) is not suitable, and therefore determines that a different NFp is to be selected (also referred to as a re-selection). As illustrated by block 626 of FIG. 2A-B, the NFc node 20 selects a further NFp node; this selection can be based on the same information as used at block 610 of FIG. 2A-B. In this example, the NFc node 20 selects the second NF node 70 as the further NFp node (NFp2).

Following the selection of the second NF node 70 as the further NFp node, the process continues with steps 628-634 of FIG. 2A-B. These steps are as described with reference to steps 612-618 of FIG. 2A-B, save that the first SCP node 10 sends the request to the second NF node 70 rather than the first NF node 30. As illustrated by arrow 636 of FIG. 2A-B, the result of the request is again a failure; the second NF node 70 is also not working. As illustrated by arrow 638 of FIG. 2A-B, the first SCP node 10 initiates transmission of the response comprising the result towards the NFc node 20.

After a number of retries and/or reselections (one retry/reselection in this example, so two NFp nodes in total contacted), the NFc node 20 considers the procedure to be a failure (as illustrated by block 640 of FIG. 2A-B).

The first NF node 30 and second NF node 70 are not working in this example, however the third NF node 90 (NFp3) is available. The NFc node 20 is not able to identify that the third NF node 90 is available, as it is not responsible for supervising the NFp nodes. The procedure is therefore considered to be a failure despite the fact that an NFp node is available, as the NFc node 20 is not aware of the status of the NFp nodes.

A similar situation to the example illustrated in FIG. 2A-B may arise in systems using multiple SCP nodes between an NFc node and NFp nodes. In systems using multiple SCP nodes, any of the SCP nodes between the NFc node and the NFp nodes may be responsible for performing selection/reselection of NFp nodes. However, as in the example illustrated in FIG. 2A-B, where the SCP node responsible for the selection/reselection of NFp nodes is not the "last hop" in the path, that is, is not in direct communication with the NFp nodes, the SCP node responsible for the selection/ reselection is required to perform the selection/reselection without knowledge of the status of the NFp nodes (as in the case of the NFc node illustrated in FIG. 2A-B). It is therefore again possible for the procedure to be determined a failure despite an available NFp node being present due to a lack of knowledge of this availability on the part of the SCP node responsible for selection/reselection.

SUMMARY

It is an object of the disclosure to obviate or eliminate at least some of the above-described disadvantages associated with existing techniques.

According to an aspect of the disclosure, there is provided a method for handling a service request in a network. The method is performed by a selection node. The method comprises initiating transmission of a first message towards at least a first Network Function, NF, node via a first Service Communication Proxy (SCP) node, wherein the first message is a status request. The method further comprises receiving, from the first SCP node, a second message indicating the status of the first NF node. The method also comprises determining whether or not to initiate transmission of a first request, for the provision of a first service, via the first SCP node to the first NF node, the determination of whether or not to initiate transmission of the first request to the first NF node being made based on the status of the first NF node indicated by the second message.

In some embodiments, first message may be a hypertext transfer protocol (HTTP) operation, such as a HTTP HEAD operation or a HTTP OPTIONS operation. In some embodiments, the HTTP operation may include the 3gpp-Sbi-Target-apiRoot header containing the apiRoot of the first NF node.

In some embodiments, the method may further comprise initiating transmission of the first message towards a second NF node via the first SCP node, and receiving, from the first SCP node, a third message indicating the status of the second NF node. In these embodiments, the step of determining may further comprise determining whether or not to initiate transmission of the first request to the second NF node based on the status of the first NF node indicated by the second message and the status of the second NF node indicated by the third message. The method may further comprise determining to send the first request to the second NF node if the third message indicates that the second NF node is available.

In some embodiments, the second message may be generated by the first NF node and sent to the first SCP node.

In some embodiments, the method may further comprise receiving by the first SCP node the first message from the selection node, modifying the destination of the message and forwarding the message to at least the first NF node; and receiving the second message from the first NF node, modifying the destination of the message and forwarding the message to the selection node. In some embodiments, the modifications may be made by altering a sbi-target-apiroot in the respective messages so that the message is sent to the intended destination.

In some embodiments, the selection node may be a selecting NF node that is responsible for selecting a destination of the first request, and the first request may be a request to provide a service requested by the selecting NF node. In other embodiments, the selection node may be a selecting SCP node that is responsible for selecting a destination of the first request, and the first request may be a request to provide a service requested by a consumer NF node.

In some embodiments, the method may further comprise checking, by a first NF node in response to receiving the first message from the first SCP node, a status of the first NF node. In some embodiments, the method may further comprise initiating transmission of a response indicating the status of the first NF node to the first SCP node.

In some embodiments, the first SCP node and the selection node may be deployed in independent deployment units; and/or the first SCP node and the first NF node may be deployed in independent deployment units.

In some embodiments the first SCP node may be deployed as a distributed network element.

In some embodiments, part of the first SCP node may be deployed in the same deployment unit as the selection node and/or part of the first SCP node may be deployed in the same deployment unit as the first NF node.

In some embodiments, at least one second SCP node may be configured to operate as an SCP between the selecting node and the first SCP node, and/or at least one third SCP node may be configured to operate as an SCP between the first SCP node and the first NF node.

In some embodiments, the first SCP node and one or both of the at least one second SCP node and the at least one third SCP node may be deployed in independent deployment units.

In some embodiments, the at least one second SCP node and/or the at least one third SCP node may be deployed as distributed network elements.

In some embodiments, an entity comprises the first SCP node and a network repository function (NRF) node.

According to another aspect of the disclosure, there is provided a selection node comprising processing circuitry configured to operate in accordance with any of the methods discussed herein in respect of the selection node.

In some embodiments, the selection node may comprise at least one memory for storing instructions which, when executed by the processing circuitry, cause the selection node to operate in accordance with the said methods.

According to another aspect of the disclosure, there is provided a first NF node comprising processing circuitry configured to operate in accordance with any of the methods discussed herein in respect of the selection node.

In some embodiments, the first NF node comprises at least one memory for storing instructions which, when executed by the processing circuitry, cause the first NF node to operate in accordance with the said methods.

According to another aspect of the disclosure, there is provided a method performed by a system. The method may comprise the method described earlier in respect of the selection node and/or the method as described earlier in respect of the first NF node.

According to another aspect of the disclosure, there is provided a system. The system may comprise at least one selection node as described earlier and/or at least one first NF node as described earlier.

According to another aspect of the disclosure, there is provided a computer program comprising instructions which, when executed by processing circuitry, cause the processing circuitry to perform the method as described earlier in respect of the selection node and/or first NF node.

According to another aspect of the disclosure, there is provided a computer program product, embodied on a non-transitory machine-readable medium, comprising instructions which are executable by processing circuitry to cause the processing circuitry to perform the method as described earlier in respect of the selection node and/or first NF node.

Thus, an improved technique for handling service requests in a network is provided.

BRIEF DESCRIPTION OF THE DRAWINGS

For a better understanding of the disclosure, and to show how it may be put into effect, reference will now be made, by way of example, to the accompanying drawings, in which.

DETAILED DESCRIPTION

Herein, techniques for handling a service request in a network are described. A service request can also be referred to as a request for a service. Generally, a service is software intended to be managed for users. Herein, a service can be any type of service, such as a communication service (e.g. a notification service or a callback service), a context management (e.g. user equipment context management (UECM)) service, a data management (DM) service, or any other type of service. The techniques described herein can be used in respect of any network, such as any communications or telecommunications network, e.g. cellular network. The network may be a fifth generation (5G) network or any other generation network. In some embodiments, the network may be a core network or a radio access network (RAN). The techniques described herein are implemented by a selection node. The selection node can, for example, be a service communication proxy (SCP) node or a network function (NF) node of a service consumer (NFc node). The SCP node can be configured to operate as an SCP between the NFc node and at least one NF node of a service producer (NFp node) in the network.

A NF is a third generation partnership project (3GPP) adopted or 3GPP defined processing function in a network, which has defined functional behaviour and 3GPP defined interfaces. A NF can be implemented either as a network element on a dedicated hardware, as a software instance running on a dedicated hardware, or as a virtualised function instantiated on an appropriate platform, e.g. on a cloud infrastructure. Herein, the term "node" in relation to an "NF node" will be understood to cover each of these scenarios.

Figure 3:
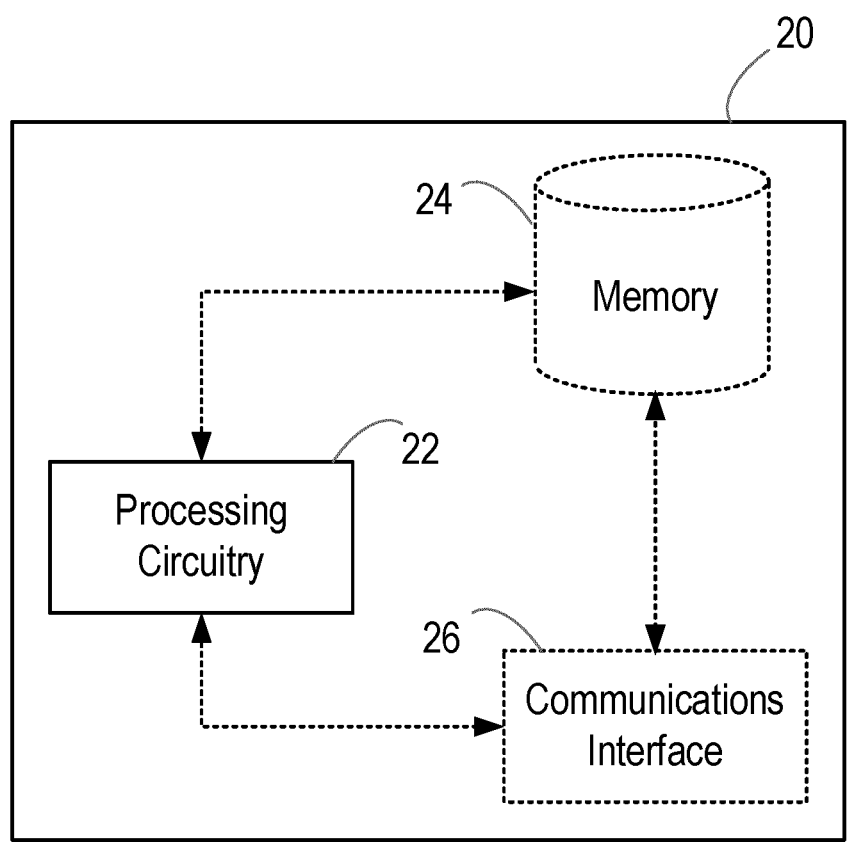
FIG. 3 is a block diagram illustrating a selection node according to an embodiment.

FIG. 3 illustrates a selection node 20 in accordance with an embodiment. In the embodiment illustrated in FIG. 3, the selection node 20 is an NFc node, however as discussed below the selection node may also or alternatively be (for example) an SCP node. The selection node 20 is for handling a service request in a network. The selection node 20 is configured to determine whether to initiate transmission of a first request to a first network function (NF) node of a service producer via at least a first SCP node in the network.

As illustrated in FIG. 3, the selection node 20 comprises processing circuitry (or logic) 22. The processing circuitry 22 controls the operation of the selection node 20 and can implement the method described herein in respect of the selection node 20. The processing circuitry 22 can be configured or programmed to control the selection node 20 in the manner described herein. The processing circuitry 22 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the selection node 20. In some embodiments, the processing circuitry 22 can be configured to run software to perform the method described herein in respect of the selection node 20. The software may be containerised according to some embodiments. Thus, in some embodiments, the processing circuitry 22 may be configured to run a container to perform the method described herein in respect of the selection node 20.

Briefly, the processing circuitry 22 of the selection node 20 is configured to initiate transmission of a first message towards at least a first NF node via a first SCP node, the first message being a status request. The processing circuitry 22 is further configured to receive a second message, from the first SCP node, indicating the status of the first NF node. The processing circuitry 22 is further configured to determine whether or not to initiate transmission of a first request for a first service to be provided, via the first SCP node) to the first NF node, the determination of whether or not to initiate transmission of the first request to the first NF node being made based on the status of the first NF node indicated by the second message. The first NF node referred to herein can be a first NF node of a service producer.

As illustrated in FIG. 3, in some embodiments, the selection node 20 may optionally comprise a memory 24. The memory 24 of the selection node 20 can comprise a volatile memory or a non-volatile memory. In some embodiments, the memory 24 of the selection node 20 may comprise a non-transitory media. Examples of the memory 24 of the selection node 20 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 22 of the selection node 20 can be connected to the memory 24 of the selection node 20. In some embodiments, the memory 24 of the selection node 20 may be for storing program code or instructions which, when executed by the processing circuitry 22 of the selection node 20, cause the selection node 20 to operate in the manner described herein in respect of the selection node 20. For example, in some embodiments, the memory 24 of the selection node 20 may be configured to store program code or instructions that can be executed by the processing circuitry 22 of the selection node 20 to cause the selection node 20 to operate in accordance with the method described herein in respect of the selection node 20. Alternatively or in addition, the memory 24 of the selection node 20 can be configured to store any information, data, messages, requests, responses, indications, notifications, signals, or similar, that are described herein. The processing circuitry 22 of the selection node 20 may be configured to control the memory 24 of the selection node 20 to store information, data, messages, requests, responses, indications, notifications, signals, or similar, that are described herein.

In some embodiments, as illustrated in FIG. 3, the selection node 20 may optionally comprise a communications interface 26. The communications interface 26 of the selection node 20 can be connected to the processing circuitry 22 of the selection node 20 and/or the memory 24 of the selection node 20. The communications interface 26 of the selection node 20 may be operable to allow the processing circuitry 22 of the selection node 20 to communicate with the memory 24 of the selection node 20 and/or vice versa. Similarly, the communications interface 26 of the selection node 20 may be operable to allow the processing circuitry 22 of the selection node 20 to communicate with the first NF node and/or any other node. The communications interface 26 of the selection node 20 can be configured to transmit and/or receive information, data, messages, requests, responses, indications, notifications, signals, or similar, that are described herein. In some embodiments, the processing circuitry 22 of the selection node 20 may be configured to control the communications interface 26 of the selection node 20 to transmit and/or receive information, data, messages, requests, responses, indications, notifications, signals, or similar, that are described herein.

Although the selection node 20 is illustrated in FIG. 3 as comprising a single memory 24, it will be appreciated that the selection node 20 may comprise at least one memory (i.e. a single memory or a plurality of memories) 14 that operate in the manner described herein. Similarly, although the selection node 20 is illustrated in FIG. 3 as comprising a single communications interface 26, it will be appreciated that the selection node 20 may comprise at least one communications interface (i.e. a single communications interface or a plurality of communications interface) 26 that operate in the manner described herein. It will also be appreciated that FIG. 3 only shows the components required to illustrate an embodiment of the selection node 20 and, in practical implementations, the selection node 20 may comprise additional or alternative components to those shown.

Figure 4:
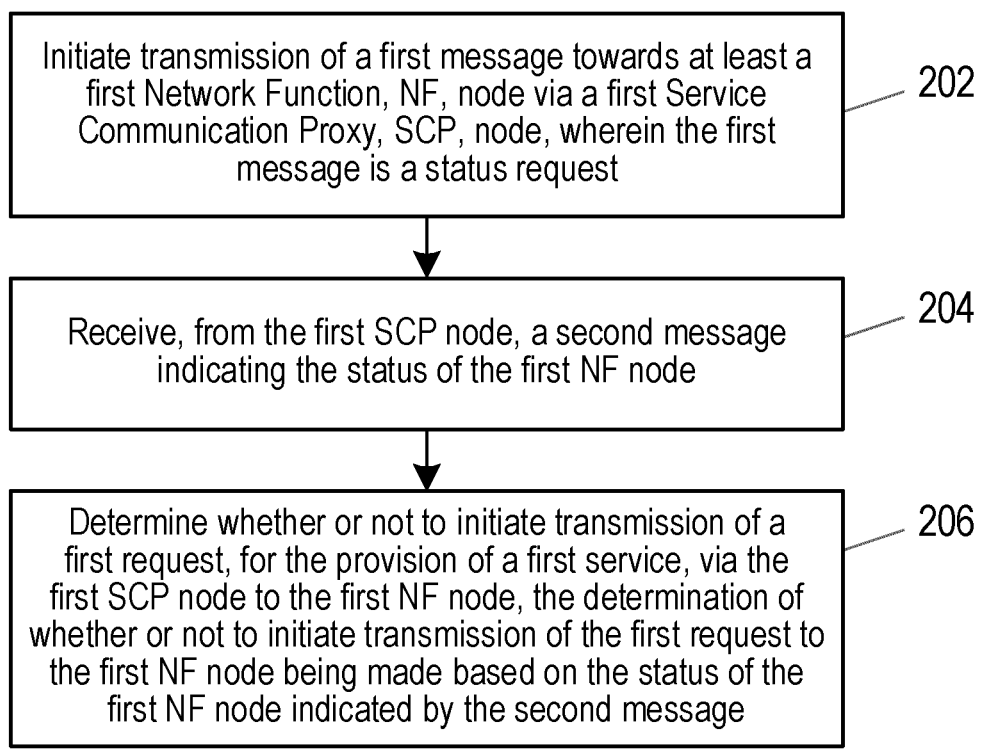
FIG. 4 is a flowchart illustrating a method performed by a selection node according to an embodiment.

FIG. 4 is a flowchart illustrating a method performed by a selection node 20 in accordance with an embodiment. The selection node 20 may be an NFc node, or may be an SCP node. The method is for handling a service request in the network. The selection node 20 described earlier with referenced to FIG. 3 can be configured to operate in accordance with the method of FIG. 4. The method can be performed by or under the control of the processing circuitry 22 of the selection node 20.

The method of FIG. 4 is performed when the selection node 20 is selecting an NFp node to provide (e.g. execute or run) a first service, that is, is selecting an NFp to which a service request will be sent. Where the selection node 20 is an NFc node, the request may be a request for a service for that NFc node. Where the selection node 20 is an SCP node, the service request may be for a service for (e.g. requested by) an NFc node, e.g. that is in direct or indirect communication with the SCP node. As illustrated at block 202 of FIG. 4, transmission of a first message (e.g. that is a service request) is initiated towards (at least) the first NF node. As previously mentioned, the first NF node referred to herein can be a first NF node of a service producer. The first message is transmitted via a first SCP node (where the selection node 20 is a SCP node, the first SCP node is a different node to the selection node, and in particular the selection node is not in direct communication with the NFp nodes).

Herein, the term "initiate" can mean, for example, cause or establish. Thus, the processing circuitry 22 of the selection node 20 can be configured to itself transmit the first message (e.g. via a communications interface 26 of the selection node 20) or can be configured to cause another node to transmit the first message.

In some embodiments, the first message may be a hypertext transfer protocol (HTTP) operation, such as a HTTP HEAD operation or a HTTP OPTIONS operation. The HTTP OPTIONS operation and HTTP HEAD operation are well-recognised operations in the art. However, for completeness, some examples of these operations are provided. The HTTP HEAD operation can, for example, be a request for one or more HTTP headers from the first NF node. In response to such a request, the selection node 20 can receive the one or more HTTP headers from the first NF node without a message body. The HTTP OPTIONS operation can, for example, be a request for information about communication options supported by the first NF node, e.g. information indicative of the parameters and requirements for specific resources or server capabilities. In response to such a request, the selection node 20 can receive the information about the communication options supported by the first NF node. The HTTP operation may include a header comprising an address of the first NF node, which may be an application programming interface (API) root of a uniform resource identifier (URI) used to reach of the first NF node (i.e. the sbi-target-apiroot or 3gpp-sbi-target-apiroot). This header can be referred to in the art as a 3gpp-Sbi-Target-apiRoot header and it may be said to contain the apiRoot of the first NF node.

Alternatively, the first message may be a specific service operation (which may also include the 3gpp-Sbi-Target-apiRoot header). Where a plurality of NFp nodes are present, the first message may be transmitted via the first SCP node to more than one of the plurality of NFp nodes, for example the first message may be transmitted to all of the plurality of NFp nodes (e.g. simultaneously or consecutively) that may be selected by the selection node 20 to provide (e.g. execute or run) a first service. As an example of this, the selection node 20 may initiate transmission of the first message towards a second NF node and/or third NF node via the first SCP node, and receive, from the first SCP node, a third message indicating the status of the second NF node and/or a fourth message indicating the status of the third NF node. The second NF node referred to herein can be a second NF node of a service producer. The third NF node referred to herein can be a third NF node of a service producer.

When the first SCP node receives the first message, the first SCP node modifies the destination of the message (for example, by modifying a 3gpp-Sbi-Target-apiRoot of the message) and forwards the message to the destination (for example, the first NF node).

As illustrated at block 204, the selection node 20 then receives (from the first SCP node) a second message that indicates the status of the first NF node (and potentially also a third message, fourth message, and so on). The second message may be generated by the first NF node, or may be generated by the first SCP node (for example, when the first SCP node sends the first message to the first NF node and receives no response). Where the first SCP node receives a response from the first NF node, it may simply modify the destination of the response (to the selection node 20) and forward the response on as the second message. The second message indicates the status of the first NF node, for example whether the first NF node is available or not available. Where the first message has been transmitted to a plurality of NFp nodes as discussed above, responses (second message, third message, etc.) may be received in respect of each of the NFp nodes for which a first message is sent. The selection node 20 then determines whether or not to initiate transmission of the first request for the provision of a first service to the first NF node (via the first SCP node), as illustrated in block 206. The determination is based on at least the status of the first NF node indicated by the second message. Where applicable, the determination may also be based on the status of the second NF node 70 and/or the status of the third NF node, as indicted by third and fourth messages respectively. Where more than three NFp nodes are sent first messages, the determination may also be based on responses from the other NFp nodes. The NFp nodes may all be from an NFp set, and may provide (e.g. execute or run) respective services. As a practical example, if the second message indicates that the first NF node is not available and the third message indicates that the second NF node is available, the selection node 20 may determine not to send the first request to the first NF node and to send the first request to the second NF node.

Figure 5:
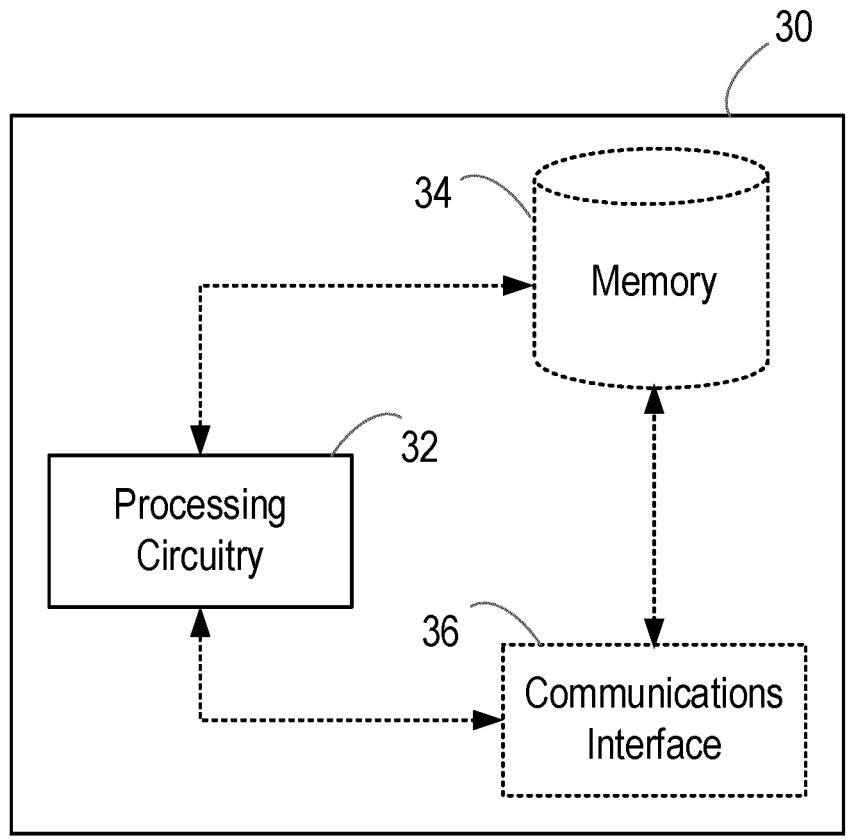
FIG. 5 is a block diagram illustrating a first network function (NF) node according to an embodiment.

FIG. 5 illustrates a first NF node 30 in accordance with an embodiment. The first NF node 30 is for handling a service request in a network. The first NF node 30 is configured to operate as a second NF node of a service producer in the network. In some embodiments, the first NF node 30 can be, for example, be a physical machine (e.g. a server) or a virtual machine (VM). The first NF node 30 can be, for example, a user equipment (UE).

As illustrated in FIG. 5, the first NF node 30 comprises processing circuitry (or logic) 32. The processing circuitry 32 controls the operation of the first NF node 30 and can implement the method described herein in respect of the first NF node 30. The processing circuitry 32 can be configured or programmed to control the first NF node 30 in the manner described herein. The processing circuitry 32 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the first NF node 30. In some embodiments, the processing circuitry 32 can be configured to run software to perform the method described herein in respect of the first NF node 30. The software may be containerised according to some embodiments. Thus, in some embodiments, the processing circuitry 32 may be configured to run a container to perform the method described herein in respect of the first NF node 30.

Briefly, the processing circuitry 32 of the first NF node 30 is configured to, in response to receiving the first message from the first SCP node 10, check a status of the first NF node. The processing circuitry 32 is further configured to initiate transmission of a response indicating the status of the first NF node 30 to the first SCP node 10. As discussed above, the response may be forwarded to the selection node 20 by the first SCP node 10 as the second message. Where plural NFp nodes are present, each NFp node which receives the first message may be configured to check its status and initiate transmission of a response.

As illustrated in FIG. 5, in some embodiments, the first NF node 30 may optionally comprise a memory 34. The memory 34 of the first NF node 30 can comprise a volatile memory or a non-volatile memory. In some embodiments, the memory 34 of the first NF node 30 may comprise a non-transitory media. Examples of the memory 34 of the first NF node 30 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 32 of the first NF node 30 can be connected to the memory 34 of the first NF node 30. In some embodiments, the memory 34 of the first NF node 30 may be for storing program code or instructions which, when executed by the processing circuitry 32 of the first NF node 30, cause the first NF node 30 to operate in the manner described herein in respect of the first NF node 30. For example, in some embodiments, the memory 34 of the first NF node 30 may be configured to store program code or instructions that can be executed by the processing circuitry 32 of the first NF node 30 to cause the first NF node 30 to operate in accordance with the method described herein in respect of the first NF node 30. Alternatively or in addition, the memory 34 of the first NF node 30 can be configured to store any information, data, messages, requests, responses, indications, notifications, signals, or similar, that are described herein. The processing circuitry 32 of the first NF node 30 may be configured to control the memory 34 of the first NF node 30 to store information, data, messages, requests, responses, indications, notifications, signals, or similar, that are described herein.

In some embodiments, as illustrated in FIG. 5, the first NF node 30 may optionally comprise a communications interface 36. The communications interface 36 of the first NF node 30 can be connected to the processing circuitry 32 of the first NF node 30 and/or the memory 34 of first NF node 30. The communications interface 36 of the first NF node 30 may be operable to allow the processing circuitry 32 of the first NF node 30 to communicate with the memory 34 of the first NF node 30 and/or vice versa. Similarly, the communications interface 36 of the first NF node 30 may be operable to allow the processing circuitry 32 of the first NF node 30 to communicate with the first SCP node 10 and/or any other node. The communications interface 36 of the first NF node 30 can be configured to transmit and/or receive information, data, messages, requests, responses, indications, notifications, signals, or similar, that are described herein. In some embodiments, the processing circuitry 32 of the first NF node 30 may be configured to control the communications interface 36 of the first NF node 30 to transmit and/or receive information, data, messages, requests, responses, indications, notifications, signals, or similar, that are described herein.

Although the first NF node 30 is illustrated in FIG. 5 as comprising a single memory 34, it will be appreciated that the first NF node 30 may comprise at least one memory (i.e. a single memory or a plurality of memories) 34 that operate in the manner described herein. Similarly, although the first NF node 30 is illustrated in FIG. 5 as comprising a single communications interface 36, it will be appreciated that the first NF node 30 may comprise at least one communications interface (i.e. a single communications interface or a plurality of communications interface) 36 that operate in the manner described herein. It will also be appreciated that FIG. 5 only shows the components required to illustrate an embodiment of the first NF node 30 and, in practical implementations, the first NF node 30 may comprise additional or alternative components to those shown.

Figure 6:
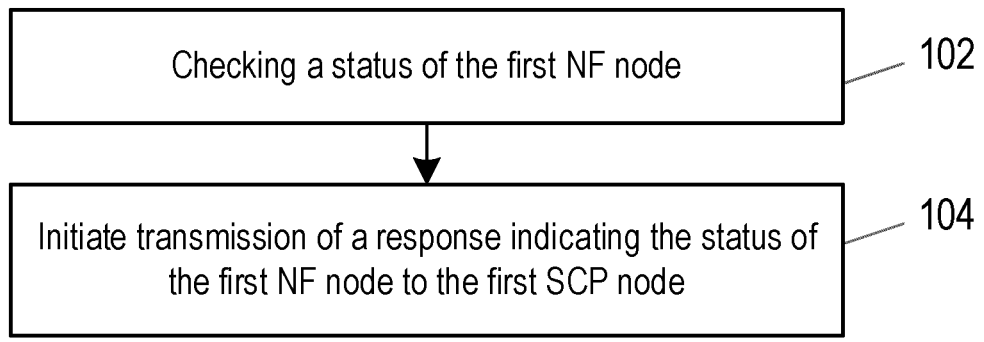
FIG. 6 is a flowchart illustrating a method performed by a first NF node according to an embodiment.

FIG. 6 is a flowchart illustrating a method performed by a first NF node 30 in accordance with an embodiment. The method of FIG. 6 is for handling a service request in the network. The first NF node 30 described earlier with reference to FIG. 5 is configured to operate in accordance with the method of FIG. 6. The method can be performed by or under the control of the processing circuitry 32 of the first NF node 30. A first SCP node 10 is configured to operate as an SCP between the first NF node 30 and selection node 20 in the network.

The method of FIG. 6 is performed in response to receiving the first message. As discussed above, the status of the first NF node 30 is checked in response to receiving the first message (see block 102 of FIG. 6). Then, transmission of a response is initiated towards the first SCP node 10, where the response indicates the status of the first NF node 30 (see block 104 of FIG. 6). As explained above, the first NF node 30 may not receive the first message (for example, because it is inactive), in which case the response is not sent.

There is also provided a system. The system can comprise at least one selection node 20 as described herein (which may be an NFc node or SCP node), at least one first SCP node 10 as described herein and/or at least one first NF node 30 as described herein. The system may also comprise any one or more of the other nodes mentioned herein.

Figure 7A:
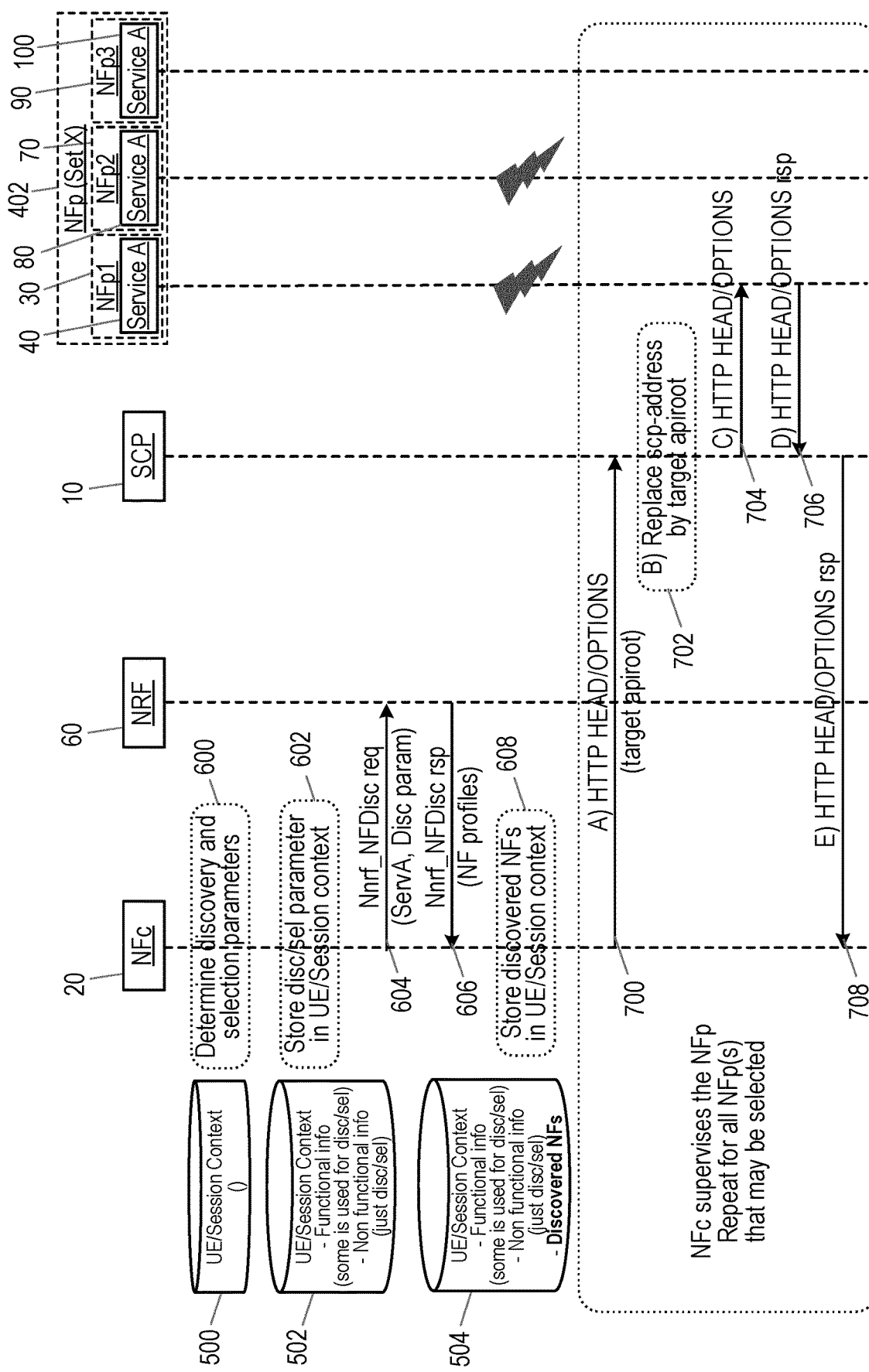
FIG. 7A-B is a signalling diagram illustrating an exchange of signals in a system according to an embodiment.
Figure 7B:
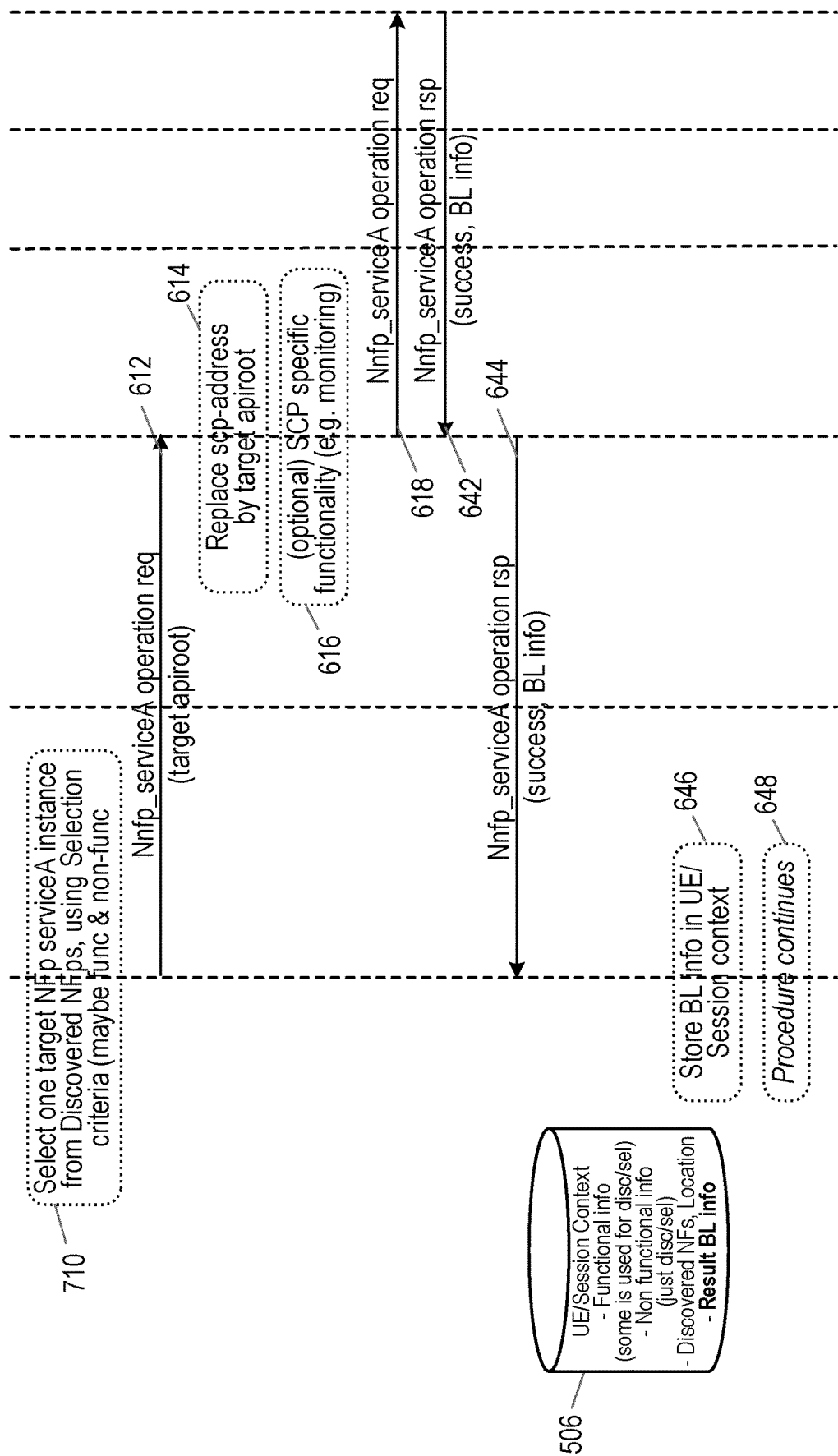

FIG. 7A-B is a signalling diagram illustrating an exchange of signals in a system according to an embodiment. The system illustrated in FIG. 7A-B comprises a selection node 20 (in this instance an NFc node, although the method is equally applicable to an SCP node as discussed above), a first SCP node 10 and a first NF node 30. The first SCP node 10 can be configured to operate as an SCP between the selection node 20 and the first NF node 30.

Also shown in FIGS. 7A-B are a second NF node 70, third NF node 90 and an NRF node 60. The first SCP node 10 can be configured to operate as an SCP between the selection node 20 and the second NF node 70. The first SCP node 10 can be configured to operate as an SCP between the selection node 20 and the third NF node 90. The first, second and third NF nodes form part of a set 402 of NFps. The first, second and third NF nodes all provide (e.g. are configured to execute or run) a service A 40, 80, 100. In some embodiments, an entity may comprise the first SCP node 10 and the NRF node 60. That is, in some embodiments, the first SCP node 10 can be merged with the NRF node 60 in a combined entity.

In some embodiments, the first SCP node 10 and the selection node 20 may be deployed in independent deployment units and/or the first SCP node 10 and the first NF node 30 may be deployed in independent deployment units. Thus, an SCP node based on independent deployment units is possible, as described in 3GPP TS 23.501 V16.5.0. In other embodiments, the first SCP node 10 may be deployed as a distributed network element. For example, in some embodiments, part (e.g. a service agent) of the first SCP node 10 may be deployed in the same deployment unit as a further node, such as the first NF node 30. Thus, an SCP node based on service mesh is possible, as described in 3GPP TS 23.501 V16.4.0.

In some embodiments, at least one second SCP node may be configured to operate as an SCP between the selection node 20 and the first SCP node 10 and/or at least one third SCP node may be configured to operate as an SCP between the first SCP node 10 and the first NF node 30. Thus, a multipath of SCP nodes is possible. In some of these embodiments, the first SCP node 10 and one or both of the at least one second SCP node and the at least one third SCP node may be deployed in independent deployment units. In some embodiments, the at least one second SCP node and/or the at least one third SCP node may be deployed as distributed network elements.

Steps 500-506 and 600-618 of FIG. 7A-B are as described earlier with reference to FIG. 2A-B. As illustrated by arrow 700 of FIG. 7A-B, e.g. following the storage of the discovered NFps at step 608 of FIG. 7A-B, the first message is sent to the first SCP node 10. More specifically, the selection node 20 initiates transmission of the first message towards the first SCP node 10. The first SCP node 10 thus receives the first message. The first SCP node 10 modifies the destination of the first message (as illustrated by block 702 of FIG. 7A-B). The first SCP node 10 forwards the message to the first NF node 30 (as illustrated by arrow 704 of FIG. 7A-B). In the example shown in FIG. 7A-B, the first NF node 30 then responds to the first message (as illustrated by arrow 706 of FIG. 7A-B, as discussed above the first NF node 30 may not respond in some situations). The first SCP node 10 modifies the destination of the response. The first SCP node 10 forwards the response to the selection node 20 as the second message (as illustrated by arrow 708 of FIG. 7A-B).

The selection node 20 then determines whether or not to initiate transmission of a first request, for the provision of a first service, to the first NF node 30. The determination of whether or not to initiate transmission of the first request to the first NF node 30 is made based on the status of the first NF node 30 indicated by the second message. Essentially, the selection node 20 selects an NFp node to which the first request is to be sent, based on the responses received by the selection node 20 to the status requests sent to the various NFps (as illustrated by block 710 of FIG. 7A-B). For the purpose of the illustration, the selection node 20 selects the third NF node 90 as this is the NFp node that is available.

Figure 1:
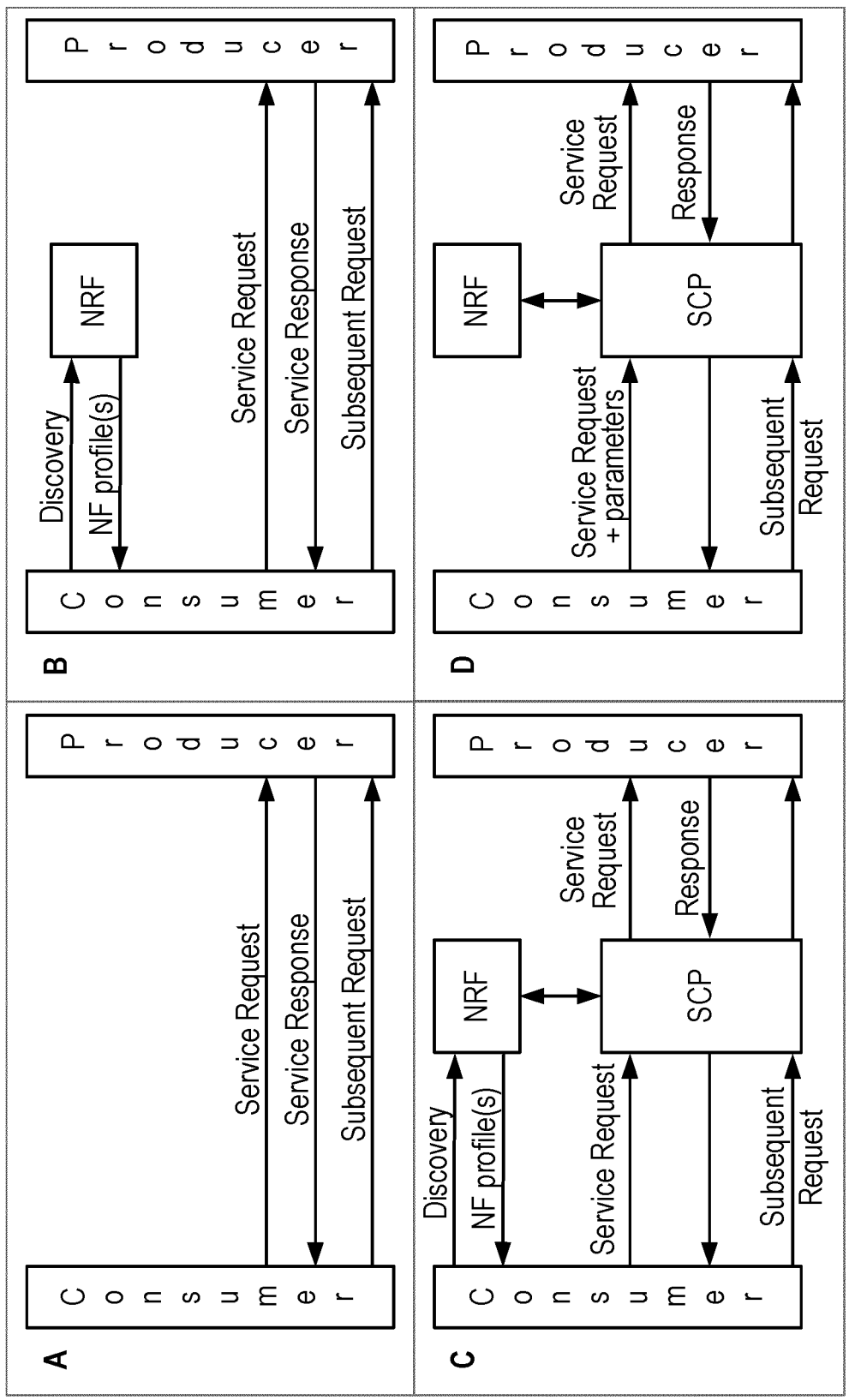
FIG. 1A-D is a block diagram illustrating different existing systems.
Figure 2A:
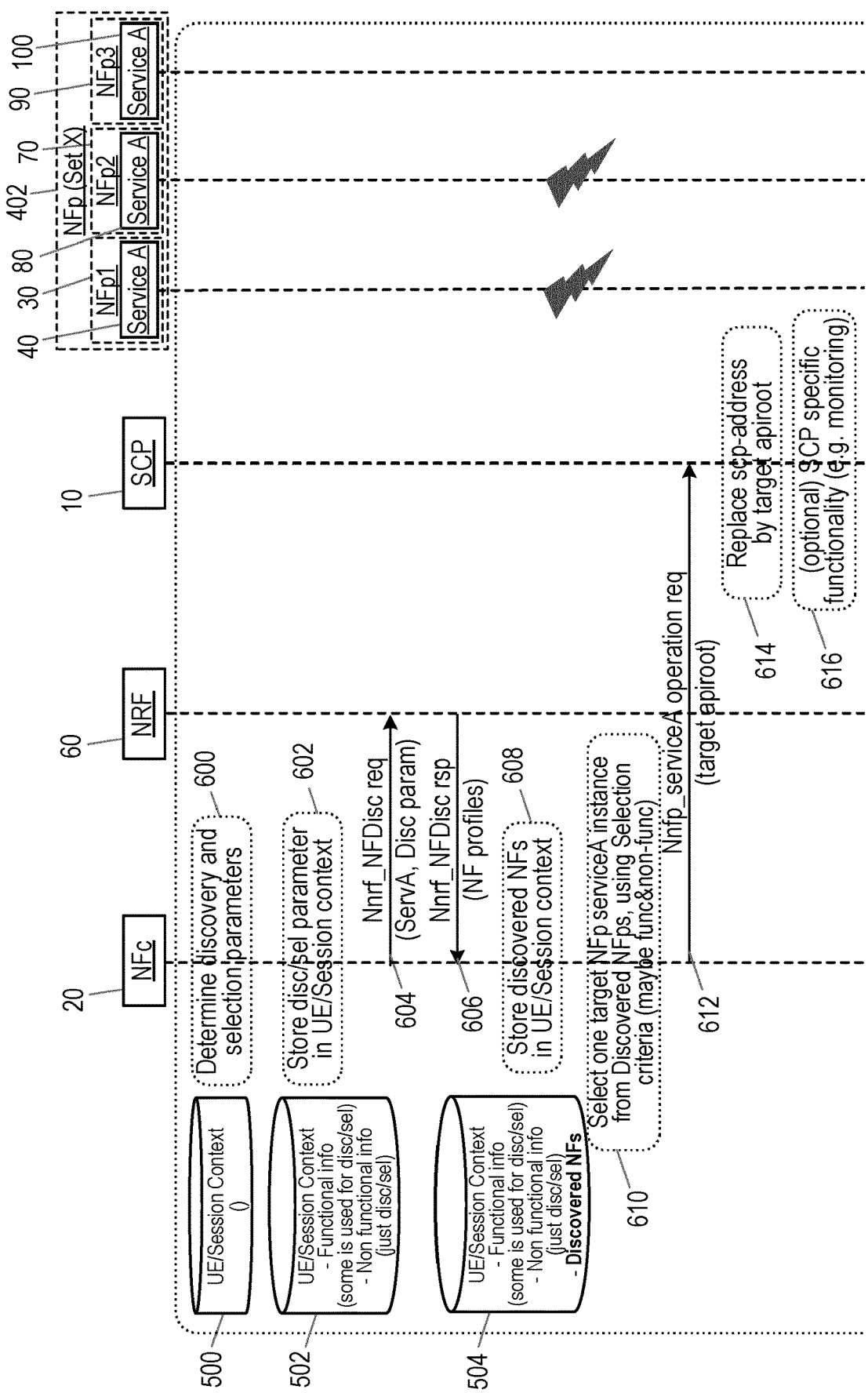
FIG. 2A-B is a signalling diagram illustrating an exchange of signals in an existing system.
Figure 2B:
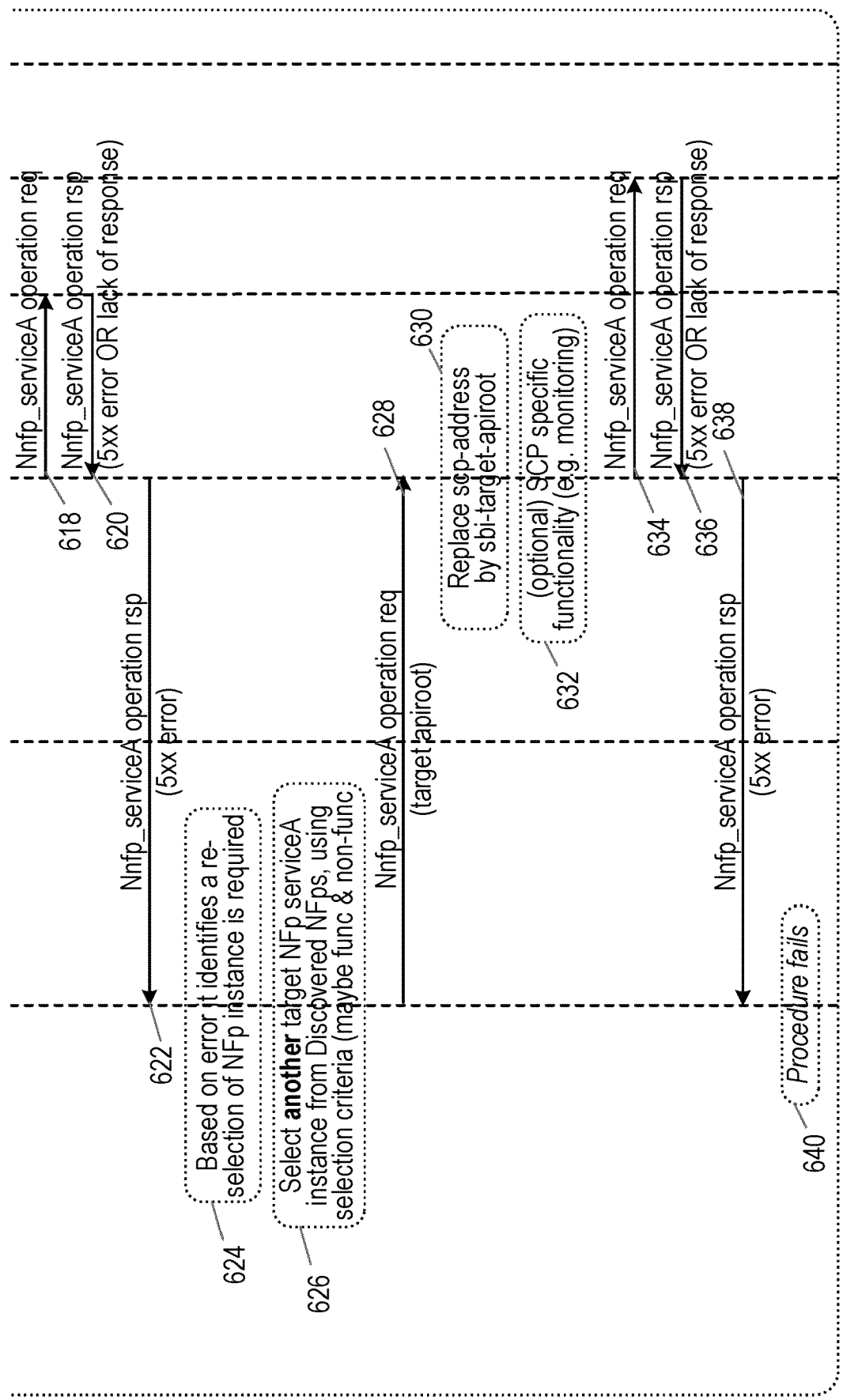

The sending of the first request (see steps 612-618 of FIG. 7A-B) then proceeds similarly to FIG. 2A-B. However, as the selection node 20 has selected the available NFp node (the third NF node 90) based on the responses to the status requests, a successful response is received at arrow 642 of FIG. 7A-B by the first SCP node 10. This successful response is sent to the selection node 20 at arrow 644 of FIG. 7A-B. More specifically, the first SCP node 10 initiates transmission of the successful response towards the selection node 20. The selection node 20 thus receives the successful response. The selection node 20 in this instance is an NFc node, so the selection node 20 stores the information in the UE/session context at block 646 of FIG. 7A-B and continues with the procedure at block 648 of FIG. 7A-B. If the selection node 20 were a further SCP node, then this further SCP node can pass the relevant information to the NFc node that requests a service be provided to continue the procedure.

Using the above method, for indirect communication with mode C (target), the NFc which is the selection node is able to directly supervise the NFp status, thereby allowing the NFc to select available NFp(s) and reducing instances of the procedure failing. For indirect communication with mode C (Set) or D (that is, with delegated discovery and selection), with a multi-SCP path where the selection node is not the last SCP in the path, then the SCP that is responsible for selection and re-selection (the selection node) is able to directly supervise the NFp status, thereby allowing the selection SCP node to select available NFp(s) and reducing instances of the procedure failing.

Figure 8:
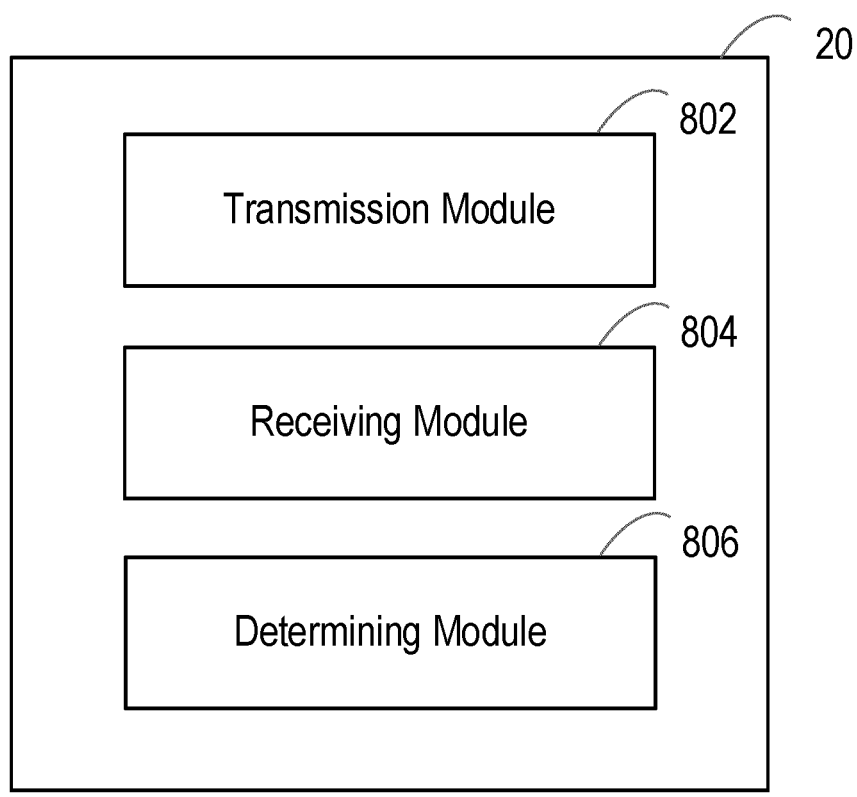
FIG. 8 is a block diagram illustrating a selection node according to an embodiment.

FIG. 8 is a block diagram illustrating a selection node 20 in accordance with an embodiment. The selection node 20 can handle a service request in a network. The selection node 20 can be an NFc node or an SCP node, as discussed above. The selection node 20 comprises a transmission module 802 configured to initiate transmission of a first message (that is a status request) towards at least a first NF node 30 via a first SCP node 10. The selection node 20 further comprises a receiving module 804 configured to receive from the first SCP node 10, a second message indicating the status of the first NF node 30. The selection node 20 also comprises a determining module 806 configured to determine whether or not to initiate transmission of a first request, for the provision of a first service, via the first SCP node 10 to the first NF node 30, the determination of whether or not to initiate transmission of the first request to the first NF node 30 being made based on the status of the first NF node 30 indicated by the second message.

Figure 9:
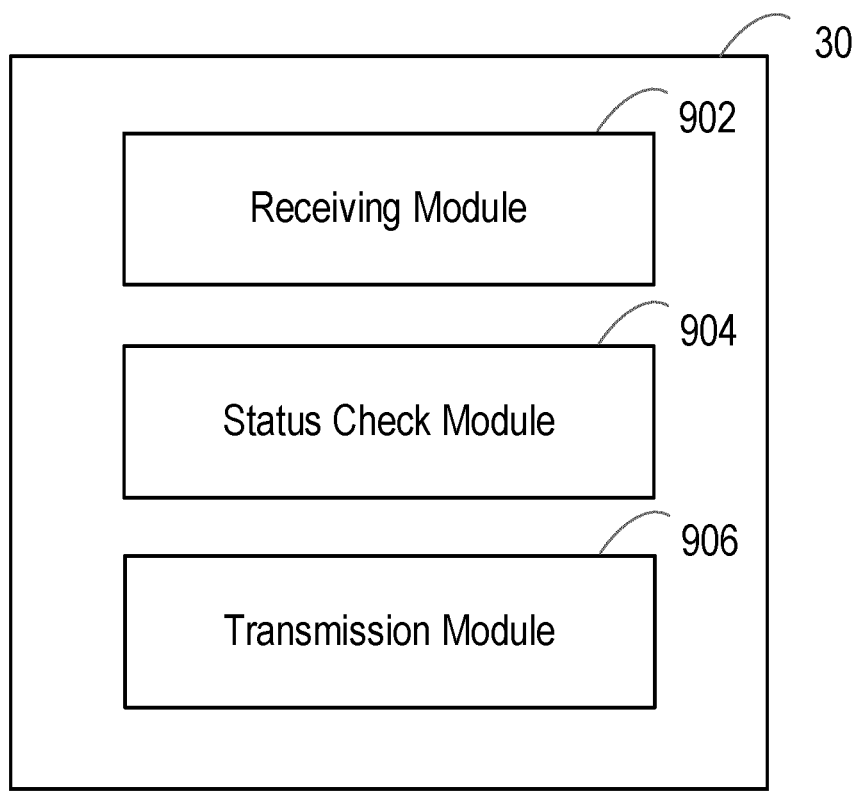
FIG. 9 is a block diagram illustrating a first NF node according to an embodiment.

FIG. 9 is a block diagram illustrating a first NF node 30 of a service producer in accordance with an embodiment. The first NF node 30 can handle a service request in a network. The first NF node 30 comprises a receiving module 902 configured to receive the first message (which is a status check message) from the first SCP node 10. The first NF node 30 further comprises a status check module 904 configured, in response to receiving the first message from the first SCP node 10, to check a status of the first NF node 30. The first NF node also comprises a transmission module 906 configured to initiate transmission of a response indicating the status of the first NF node 30 to the first SCP node 10.

There is also provided a computer program comprising instructions which, when executed by processing circuitry (such as the processing circuitry 22 of the selection node 20 described earlier and/or the processing circuitry 32 of the first NF node 30 described earlier), cause the processing circuitry to perform at least part of a method described herein. There is provided a computer program product, embodied on a non-transitory machine-readable medium, comprising instructions which are executable by processing circuitry (such as the processing circuitry 22 of the selection node 20 described earlier and/or the processing circuitry 32 of the first NF node 30 described earlier) to cause the processing circuitry to perform at least part of the method described herein. There is provided a computer program product comprising a carrier containing instructions for causing processing circuitry (such as the processing circuitry 22 of the selection node 20 described earlier and/or the processing circuitry 32 of the first NF node 30 described earlier) to perform at least part of the method described herein. In some embodiments, the carrier can be any one of an electronic signal, an optical signal, an electromagnetic signal, an electrical signal, a radio signal, a microwave signal, or a computer-readable storage medium.

Other embodiments include those defined in the following numbered statements:

Embodiment 1. A method for handling a service request in a network, wherein the method is performed by a selection node (20), the method comprising:
  initiating transmission (202) of a first message towards at least a first Network Function, NF, node (30) via a first Service Communication Proxy, SCP, node (10), wherein the first message is a status request;
  receiving (204), from the first SCP node (10), a second message indicating the status of the first NF node (30); and
  determining (206) whether or not to initiate transmission of a first request, for the provision of a first service, via the first SCP node (10) to the first NF node (30), the determination of whether or not to initiate transmission of the first request to the first NF node (30) being made based on the status of the first NF node (30) indicated by the second message.

Embodiment 2. The method according to Embodiment 1, wherein the first message is an HTTP operation.

Embodiment 3. The method according to Embodiment 2, wherein the HTTP operation is a HTTP HEAD operation or a HTTP OPTIONS operation.

Embodiment 4. The method according to Embodiment 2 or 3, wherein the HTTP operation includes the 3gpp-Sbi-Target-apiRoot header containing the apiRoot of the first NF node (30).

Embodiment 5. The method according to any of Embodiments 1 to 4, further comprising:
  initiating transmission of the first message towards a second NF node (70) via the first SCP node (10); and
  receiving, from the first SCP node (10), a third message indicating the status of the second NF node (70),
  wherein the step of determining further comprises determining whether or not to initiate transmission of the first request to the second NF node (70) based on the status of the first NF node (30) indicated by the second message and the status of the second NF node (70) indicated by the third message.

Embodiment 6. The method according to Embodiment 5, further comprising determining to send the first request to the second NF node (70) if the third message indicates that the second NF node (70) is available.

Embodiment 7. The method according to any of Embodiments 1 to 6, wherein the second message is generated by the first NF node (30) and sent to the first SCP node (10).

Embodiment 8. The method according to any of Embodiments 1 to 7, further comprising, by the first SCP node (10):
  receiving the first message from the selection node (20), modifying the destination of the message and forwarding the message to at least the first NF node (30); and
  receiving the second message from the first NF node (30), modifying the destination of the message and forwarding the message to the selection node (20).

Embodiment 9. The method according to any of Embodiments 1 to 8, wherein the selection node (20) is a selecting NF node (20) that is responsible for selecting a destination of the first request, and wherein the first request is a request to provide a service requested by the selecting NF node (20).

Embodiment 10. The method according to any of Embodiments 1 to 8, wherein the selection node is a selecting SCP node that is responsible for selecting a destination of the first request, and wherein the first request is a request to provide a service requested by a consumer NF node.

Embodiment 11. The method according to any of Embodiments 1 to 10, further comprising, by a first Network Function, NF, node (30):
  in response to receiving the first message from the first SCP node (10), checking (102) a status of the first NF node (30); and
  initiating transmission (104) of a response indicating the status of the first NF node (30) to the first SCP node (10).

Embodiment 12. A method according to any of Embodiments 1 to 11, wherein:
  the first SCP node (10) and the selection node (20) are deployed in independent deployment units; and/or
  the first SCP node (10) and the first NF node (30) are deployed in independent deployment units.

Embodiment 13. A method according to any of Embodiments 1 to 11, wherein:
the first SCP node (10) is deployed as a distributed network element.

Embodiment 14. A method according to Embodiment 13, wherein:
part of the first SCP node (10) is deployed in the same deployment unit as the selection node (20); and/or
part of the first SCP node (10) is deployed in the same deployment unit as the first NF node (30).

Embodiment 15. A method according to any of Embodiments 1 to 14, wherein:
at least one second SCP node is configured to operate as an SCP between the selecting node (20) and the first SCP node (10); and/or
at least one third SCP node is configured to operate as an SCP between the first SCP node (10) and the first NF node (30).

Embodiment 16. A method according to Embodiment 15, wherein:
the first SCP node (10) and one or both of the at least one second SCP node and the at least one third SCP node are deployed in independent deployment units.

Embodiment 17. A method according to Embodiment 15, wherein:
the at least one second SCP node and/or the at least one third SCP node are deployed as distributed network elements.

Embodiment 18. A method according to any of Embodiments 1 to 17, wherein:
an entity comprises the first SCP node (10) and a network repository function, NRF (60).

Embodiment 19. A selection node (20) comprising:
processing circuitry (12) configured to operate in accordance with any of Embodiments 1 to 18.

Embodiment 20. A selection node (20) according to Embodiment 19, wherein:
the selection node (20) comprises:
at least one memory (14) for storing instructions which, when executed by the processing circuitry (12), cause the selection node (20) to operate in accordance with any of Embodiments 1 to 18.

Embodiment 21. A first NF node (30) comprising:
processing circuitry (32) configured to operate in accordance with Embodiment 11.

Embodiment 22. A first NF node (30) according to Embodiment 21, wherein:
the first NF node (30) comprises:
at least one memory (34) for storing instructions which, when executed by the processing circuitry (32), cause the first NF node (30) to operate in accordance with Embodiment 11.

Embodiment 23. A system comprising:
at least one selection node (20) according to Embodiment 19 or 20; and/or
at least one first NF node (30) according to Embodiment 21 or 22.

Embodiment 24. A computer program comprising instructions which, when executed by processing circuitry, cause the processing circuitry to perform the method according to any of Embodiments 1 to 18.

Embodiment 25. A computer program product, embodied on a non-transitory machine-readable medium, comprising instructions which are executable by processing circuitry to cause the processing circuitry to perform the method according to any of Embodiments 1 to 18.

In some embodiments, the selection node functionality and/or the first NF node functionality described herein can be performed by hardware. Thus, in some embodiments, any one or more of the selection node 20 and the first NF node 30 described herein can be a hardware node. However, it will also be understood that optionally at least part or all of the selection node functionality and/or the first NF node functionality described herein can be virtualized. For example, the functions performed by any one or more of the selection node 20 and the first NF node 30 described herein can be implemented in software running on generic hardware that is configured to orchestrate the node functionality. Thus, in some embodiments, any one or more of the selection node 20 and the first NF node 30 described herein can be a virtual node. In some embodiments, at least part or all of the selection node functionality and/or the first NF node functionality described herein may be performed in a network enabled cloud. The selection node functionality and/or the first NF node functionality described herein may all be at the same location or at least some of the node functionality may be distributed.

It will be understood that at least some or all of the method steps described herein can be automated in some embodiments. That is, in some embodiments, at least some or all of the method steps described herein can be performed automatically. The method described herein can be a computer-implemented method.

Thus, in the manner described herein, there is advantageously provided an improved technique for handling service requests in a network. The selection node 20 can be provided with status information to allow a selection/re-selection of an available NFp node to provide a service for a consumer node (which may be the selecting node where the selecting node is a consumer node, or may be another node where the selecting node is a SCP node), thereby reducing instances of procedure failures.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for handling a service request in a network, wherein the method is performed by a selection node, the method comprising:
   initiating transmission of a first message towards at least a first Network Function, NF, node via a first Service Communication Proxy, SCP, node, wherein the first message is a status request;
   receiving, from the first SCP node, a second message indicating the status of the first NF node; and
   determining whether or not to initiate transmission of a first request, for the provision of a first service, via the first SCP node to the first NF node, the determination of whether or not to initiate transmission of the first request to the first NF node being made based on the status of the first NF node indicated by the second message.

2. The method as claimed in claim 1, wherein:
   the first message is a hypertext transfer protocol, HTTP, operation.

3. The method as claimed in claim 2, wherein:
the HTTP operation is a HTTP HEAD operation or a HTTP OPTIONS operation.

4. The method as claimed in claim 2, wherein:
the HTTP operation includes the 3gpp-Sbi-Target-apiRoot header containing the apiRoot of the first NF node.

5. The method as claimed in claim 1, the method further comprising:
initiating transmission of the first message towards a second NF node via the first SCP node; and
receiving, from the first SCP node, a third message indicating the status of the second NF node,
wherein the step of determining further comprises determining whether or not to initiate transmission of the first request to the second NF node based on the status of the first NF node indicated by the second message and the status of the second NF node indicated by the third message.

6. The method as claimed in claim 5, the method further comprising:
determining to send the first request to the second NF node if the third message indicates that the second NF node is available.

7. The method as claimed in claim 1, wherein:
the second message is generated by the first NF node and sent to the first SCP node.

8. The method as claimed in claim 1, the method further comprising, by the first SCP node:
receiving the first message from the selection node, modifying the destination of the message and forwarding the message to at least the first NF node; and
receiving the second message from the first NF node, modifying the destination of the message and forwarding the message to the selection node.

9. The method as claimed in claim 1, wherein:
the selection node is a selecting NF node that is responsible for selecting a destination of the first request, and wherein the first request is a request to provide a service requested by the selecting NF node; or
the selection node is a selecting SCP node that is responsible for selecting a destination of the first request, and wherein the first request is a request to provide a service requested by a consumer NF node.

10. The method as claimed in claim 1, the method further comprising, by the first NF node:
checking a status of the first NF node in response to receiving the first message from the first SCP node; and
initiating transmission of a response indicating the status of the first NF node to the first SCP node.

11. A selection node comprising:
processing circuitry and at least one memory for storing instructions which, when executed by the processing circuitry, cause the selection node to:
initiate transmission of a first message towards at least a first Network Function, NF, node via a first Service Communication Proxy, SCP, node, wherein the first message is a status request;
receive, from the first SCP node, a second message indicating the status of the first NF node; and
determine whether or not to initiate transmission of a first request, for the provision of a first service, via the first SCP node to the first NF node, the determination of whether or not to initiate transmission of the first request to the first NF node being made based on the status of the first NF node indicated by the second message.

* * * * *